United States Patent
Bryant et al.

(10) Patent No.: US 9,321,390 B2
(45) Date of Patent: Apr. 26, 2016

(54) BOAT LIFT TRAILER

(71) Applicants: Gary Bryant, Rochester, IN (US); Brady Bryant, Rochester, IN (US)

(72) Inventors: Gary Bryant, Rochester, IN (US); Brady Bryant, Rochester, IN (US)

( * ) Notice: Subject to any disclaimer, the term of this patent is extended or adjusted under 35 U.S.C. 154(b) by 0 days.

(21) Appl. No.: 14/601,730

(22) Filed: Jan. 21, 2015

(65) Prior Publication Data

US 2015/0217671 A1 Aug. 6, 2015

Related U.S. Application Data

(60) Provisional application No. 61/936,042, filed on Feb. 5, 2014.

(51) Int. Cl.
*B60P 3/00* (2006.01)
*B60P 3/10* (2006.01)

(52) U.S. Cl.
CPC ................... *B60P 3/1033* (2013.01)

(58) Field of Classification Search
CPC .... B60P 3/1066; B60P 3/1033; B60P 3/1075; B60P 3/10; B60P 1/4414
USPC ...................................... 280/414.1
See application file for complete search history.

(56) References Cited

U.S. PATENT DOCUMENTS

| | | | | |
|---|---|---|---|---|
| 3,190,674 A * | 6/1965 | Carter | ................... | B60P 3/1033 280/414.1 |
| 3,191,784 A * | 6/1965 | Wade | ................... | B60P 3/1033 254/45 |
| 3,870,339 A * | 3/1975 | Goff | ................... | B60P 3/1033 280/414.1 |
| 4,420,165 A * | 12/1983 | Goodin | ................. | B60P 3/1033 280/414.1 |
| 5,908,264 A | 6/1999 | Hey | | |
| 5,921,742 A * | 7/1999 | Gearhart | .............. | B62D 63/061 414/480 |
| 6,575,487 B1 * | 6/2003 | Krause | .................. | B60P 3/1066 114/344 |
| 6,695,287 B1 * | 2/2004 | De Boer | .................. | B60P 3/122 254/10 C |
| 6,695,533 B1 | 2/2004 | Bulmann | | |
| 6,719,317 B1 * | 4/2004 | Grovender | ............ | B60P 3/1033 280/414.1 |
| 7,059,803 B2 | 6/2006 | Floe et al. | | |
| 7,243,747 B2 * | 7/2007 | Bender | .................. | B62D 59/04 180/15 |
| 7,267,066 B2 | 9/2007 | Derner | | |
| 7,628,564 B2 * | 12/2009 | Krause | .................. | B60P 3/1033 114/344 |
| 8,152,100 B2 * | 4/2012 | Nicholas | ............... | B60P 3/1033 114/261 |
| 8,282,053 B2 | 10/2012 | Mensching | | |
| 8,596,906 B2 | 12/2013 | Ebbenga et al. | | |
| 2011/0008139 A1* | 1/2011 | Hey | ........................ | B60L 1/003 414/495 |

* cited by examiner

*Primary Examiner* — Kevin Hurley
(74) *Attorney, Agent, or Firm* — Egbert Law Offices, PLLC (57) ABSTRACT

A trailer is provided for removing a boat lift from a body of water. The trailer has a trailer body with a stationary axle at one end thereof. A lifting surface is movably positioned relative to the trailer body and is movable upwardly therefrom with a scissor lift. A pivoting axle assembly is provided on the trailer body so as to lift the wheels of the stationary axle to allow for the trailer to be moved within the boat lift. When the wheels of the stationary axle are lowered by raising the pivoting axle assembly, the lifting surface can then be moved upwardly so as to contact and lift the boat lift out of the body of water.

18 Claims, 8 Drawing Sheets

BOAT LIFT TRAILER

RELATED U.S. APPLICATIONS

The present application claims priority from Provisional Patent Application Ser. No. 61/936,042, filed on Feb. 5, 2014, and entitled "Boat Lift Trailer".

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of boat lifts. More particularly, the present invention relates to a trailer for removing a boat lift from the water. Even more particularly, the present invention relates to a trailer which can remove a boat lift from the water without the operator having to enter the water.

2. Description of Related Art Including Information Disclosed Under 37 CFR 1.97 and 37 CFR 1.98

Boat lifts are commonly used for storing boats or other personal water craft, such as jet skis, out of the water. A boat lift is positioned in the water and includes a mechanism for lifting the boat or water craft above the waterline. In use, a boat is floated over the mechanism of the boat lift, within the confines of the boat lift structure. Typically, the boat is lifted by a movable cradle that can be raised to lift the boat or other water craft into a storage position out of water contact. The mechanism can also be used to lower the boat or other water craft into the water such that the boat or water craft can be used. Various types of powered boat lifts and manual boat lifts are used.

There are a number of advantages to storing a boat out of the water when it is not in use. Out-of-water storage prevents damage resulting from the boat bumping against adjacent docks, other water craft, or floating debris. Storing the boat out of water reduces the possibility of the boat breaking free and either floating away or running aground. Out-of-water storage also lessens boat damage associated with long-term exposure to water and water-carried pollutants, and the attachment of barnacles or other marine growth to the boat's hull.

In northern locations, where the body of water may freeze during the winter, boat lifts are generally freestanding structures that can be taken out of the water. If the boat lift is not taken out of the water, it may be subjected to the movement of ice during spring thaw which may result in irreparable damage to the boat lift. Therefore, before the water freezes, the boat lift is removed from the water. In the spring, once ice melts, the boat lift is then put back into the water.

Installing and removing a boat lift can sometimes be a difficult operation. On many populous lakes, services exists in which a barge and a crane are used to lift the boat lift in and out of the water. However, due to the cost of such a service, many boat lift owners install and remove the boat lift without the aid of such service.

As the boat lift must hold boats weighing over 5000 pounds, the boat lift itself is of considerable weight and can prove to be quite unwieldy. As such, removal of the boat lift out of water can be a difficult task.

Many patents have issued in the past relating to boat lift technology. For example, U.S. Pat. No. 7,267,066, issued on Sep. 11, 2000 to Derner, discloses a pontoon boat lift. The pontoon boat lift of the Derner patent is unique in that it attaches to the bottom of the pontoon boat. Legs pivot outwardly such that a base pad connected to the bottom end of the legs contacts the bottom of the body of water. When the leg is fully extended, the pontoon boat is lifted above the water surface. Such a system is not generally applicable for all uses, and requires modification of existing boats.

U.S. Pat. No. 5,908,264, issued on Jun. 1, 1999 to Hey, teaches a watercraft or boat lift. The watercraft lift has raised and lowered positions. The lift includes a substantially rectangular base with longitudinal side beams and front, rear, and intermediate transverse beams connected to the longitudinal beams. The intermediate transverse beam is located between the front and rear transverse beams and at a height lower than the front and rear transverse beams. Forward booms are pivotably connected to the base at a location near the front transverse beam. Rear booms are pivotably connected to the base at a location near the intermediate transverse beam. A watercraft support platform is pivotally connected to the forward and rear booms. The raising and lowering of the lift is accomplished by an actuation assembly.

U.S. Pat. No. 6,695,533, issued on Feb. 24, 2004 to Bulmann, teaches a hydraulically actuated boat hoist or lift. The in-water boat hoists of the Bulmann patent have a shape that is most commonly used in boat lifts. Namely, a frame structure having vertical and horizontal members, with a cradle position therein. In the Bulmann patent, a hydraulic cylinder is utilized to extend and retract a cylindrical rod with a vertical cross member at its end. Lift cables are attached to the cross member on opposite sides and extend rearwardly toward the hydraulic cylinder. One cable is horizontally reversed, 180° by a pulley, with both cables then directed 90° downward over respective pulleys and affixed to opposite ends of the cradle the hoists, equalizing end to end lift. Side to side lift may be equalized by second parallel device or by leveling cables.

U.S. Pat. No. 7,059,803, issued on Jun. 13, 2006 to Floe et al., teaches a powered boat lift with electronic controls. The boat lift leg and frame structure utilizes a ballscrew lifting mechanism driven by a reversible electric motor to raise and lower a boat support carriage. The raising and lowering operation of the ball screw mechanism is controlled by electronic circuitry that includes wired and remote direction selection. Lifting logic with conflict detection and direction reversal delay, lighting control logic, motor power control, and overload detection logic are also provided.

U.S. Pat. No. 8,282,053, issued on Oct. 9, 2012 to Mensching, teaches an apparatus for adjusting the length of a boat lift leg. The patent describes how the length of the leg of the boat lift may either be shortened or lengthened without the necessity of entering the water in which the boat lift is position. The Mensching patent also shows a boat lift having the conventional four post structure.

Some solutions have been suggested to overcome the problem of the difficulty of removal of the boat lifts from the water. For example, wheels can be attached to the boat lift such that it can be more easily removed from the water. U.S. Pat. No. 8,596,906, issued on Dec. 3, 2013 to Ebbegna et al., suggests the use of a retractable wheel for a boat lift and other structures. The retractable wheel can be attached to the boat lift. A wheel, similar to a steering wheel, can be used to raise and lower the wheels and tires affixed to the boat lift.

Solutions such as the one found in the Ebbenga patent are not very widespread, and traditionally, pontoon trailers are used to transport boat lifts by using a reverse winch tube. This tube has a single crank with two cables that hook on the bottom of the boat lift. This portion of the process has to be done in the water.

The standard pontoon trailer, used to transport boat lifts, is 4 feet wide. Comparatively, the average boat lift is 8 feet wide. As such by loading the boat lift onto the standard pontoon trailer, this can cause the trailer to be off-balance and unsafe when the boat is sitting thereon. Thus, by using pontoon trailers, the operator and the public are both at risk due to the unequal weight the trailer is carrying. The process of loading and unloading a boat lift using a pontoon trailer is also somewhat time-consuming, requiring a total of about 10 minutes each time.

The process of removing a boat lift in the water, in the traditional way, starts by the driver of the truck and trailer backing their vehicle and trailer down the boat ramp to the boat lift sitting at the end of the ramp. The driver must then get out of the vehicle, and manually put ramps down on the lift to enable the trailer tires to roll over the base member of the boat lift. Necessarily, these ramps must be put in the water. Both times of the year the trailer is used to remove or replace the boat lift, water temperatures are generally frigid. As such, the workers have to work quickly so that their hands and feet do not get too cold. The trailer only rolls over the ramps once the driver gets back into the vehicle and backs the trailer up even further. Once the trailer tires are over the base of the boat lift, the driver must get back out of the vehicle and remove the ramps from the water, before any other actions are taken. The driver then has to manually crank up the bottom of the lift to the bottom of the pontoon trailer rack. Once everything is stable and relatively secure, the driver can then get back into the vehicle and slowly drive away from the boat ramp.

It is an object of the present invention to provide a boat lift trailer that enables removal of a standard four post boat lift from the water.

It is another object of the present invention to provide a boat lift trailer which allows for the removal of the boat lift without the operator entering the water or even exiting his or her vehicle.

It is another object of the present invention to provide a boat lift trailer that eliminates the need for specialized wheels to be attached to the boat lift.

It is another object of the present invention to provide a boat lift trailer which can remove a boat lift quickly and easily.

It is yet another object of the present invention to provide a boat lift trailer which is stable when loaded.

Finally, it is yet another object of the present invention to provide a boat lift trailer which facilitates the safe transfer transportation of the boat lifts.

These and other objects and advantages of the present invention will become apparent from a reading of the attached specification and appended claims.

BRIEF SUMMARY OF THE INVENTION

In one embodiment, the present invention is an apparatus for removing a boat lift from body of water. The apparatus includes a trailer body having stationary axle adjacent a first end thereof, and a trailer jack adjacent the second end thereof. The stationary axle has wheels connected thereto. The lifting surface is movably positioned relative to the trailer body. A lifting means is affixed to the trailer body and to the lifting surface. The lifting means is for lifting the lifting surface from a first position adjacent the trailer body to second position away from the trailer body. A pivoting axle assembly is affixed to the trailer body between the first end and the second end, the pivoting axle assembly having at least one wheel thereon. The pivoting axle assembly is movable from a first position wherein the wheel of the pivoting axle assembly is positioned above a surface therebelow to a second position wherein the wheel of the pivoting axle assembly is positioned on the surface therebelow. The wheels of the stationary axle of the trailer body are above the surface therebelow when the pivoting axle assembly is in the second position.

In one embodiment of the present invention, the lifting means is a scissor lift. In an embodiment of the invention, the lifting surface is a frame structure having a pair of lifting arms. Each of the lifting arms have a first end which curves downwardly in the direction towards surface below and a bumper at a second end thereof opposite the first end.

In one embodiment of the present invention, the apparatus further includes a control panel mounted adjacent the second end of the trailer body. The control panel is suitable for selectively operating the lifting means and the pivoting axle assembly. A remote control may be provided which is in communication with the control panel.

In one embodiment of the present invention, at least one hydraulic pump is provided for operating one or more of the lifting means and the pivoting axle assembly. The pivoting axle assembly may include an axle having wheels opposing end thereof, a pivoting member affixed to the axle at one end thereof and to the trailer body at the opposite end, and an actuator affixed the axle at one end thereof and to the trailer body at an opposite end thereof. The apparatus may further include a hydraulic pump operatively connected to the actuator, where the actuator is a hydraulic cylinder.

The present invention is also trailer apparatus for removing a boat lift from the body of water. The trailer apparatus includes a body having wheels adjacent a first end thereof and a trailer jack adjacent the second end thereof. A lifting frame is positioned above the trailer body and has a first lifting arm and a second lifting arm. A scissor lift is affixed to the body and lifting frame. The scissor lift is movable from a first position wherein the lifting frame is positioned adjacent the body to a second position wherein the lifting frame is positioned upwardly away from the body. A pivoting axle assembly is affixed to the body between the wheels and the trailer jack. The pivoting axle assembly has at least one wheel thereon, and is movable from a first position wherein the wheel is positioned above an underlying surface below to second position wherein the wheel is positioned on the underlying surface. The wheels of the stationary axle of the body are above the underlying surface when the pivoting axle is in the second position. The lifting arms may have a bumper on one end thereof and a curved end at the opposite end thereof.

A control panel may be mounted on the body that adjacent the trailer jack, the control panel being suitable for selectively operating the first hydraulic pump and the second hydraulic pump, the first hydraulic pump being connected to the lifting frame, the second hydraulic pump being connected to the pivoting axle assembly. A remote control may be in communication with the control panel. The top surface of the first lifting arm the second lifting may define a lifting surface.

The present invention is also a method of removing a boat lift from body of water. The boat lift has upper and lower horizontal members and vertical post members. The method includes the steps of providing a trailer having a body with wheels thereon. The trailer having a lifting surface vertically movable from a first position adjacent the body to second position away from the body. The trailer also has a pivoting axle assembly with wheels thereon which is movable from a first position adjacent a body to second position when the wheels of the pivoting axle assembly contact an underlying surface. The method also includes a step of moving the trailer to a position adjacent the boat lift. Next, the pivoting axle assembly is lowered from the first position to the second position so as to cause the wheels of the pivoting axle assembly to contact the underlying surface, and also to cause the wheels of the trailer body to be positioned off the underlying service a suitable distance so as to clear the horizontal members of the boat lift. Next, the trailer is moved such that the lifting surface is within the vertical post members of the boat lift. Next, the pivoting axle assembly is raised from the second position to the first position, and the lifting surface is thereafter raised so as to contact the bottom sides of the horizontal members and to lift the boat upwardly.

In the method of the present invention, the method also includes a step of moving the trailer forward so as to remove the boat lift from the body of water. The method may also include step of remotely controlling operation of the pivoting axle assembly in the movement of the lifting surface.

This foregoing Section is intended to describe, in generality, the preferred embodiment of the present invention. It is understood that modifications to this preferred embodiment can be made within the scope of the present invention. As such, this Section should not to be construed, in any way, as limiting of the broad scope of the present invention. The present invention should only be limited by the following claims and their legal equivalents.

DETAILED DESCRIPTION OF THE INVENTION

Figure 1:
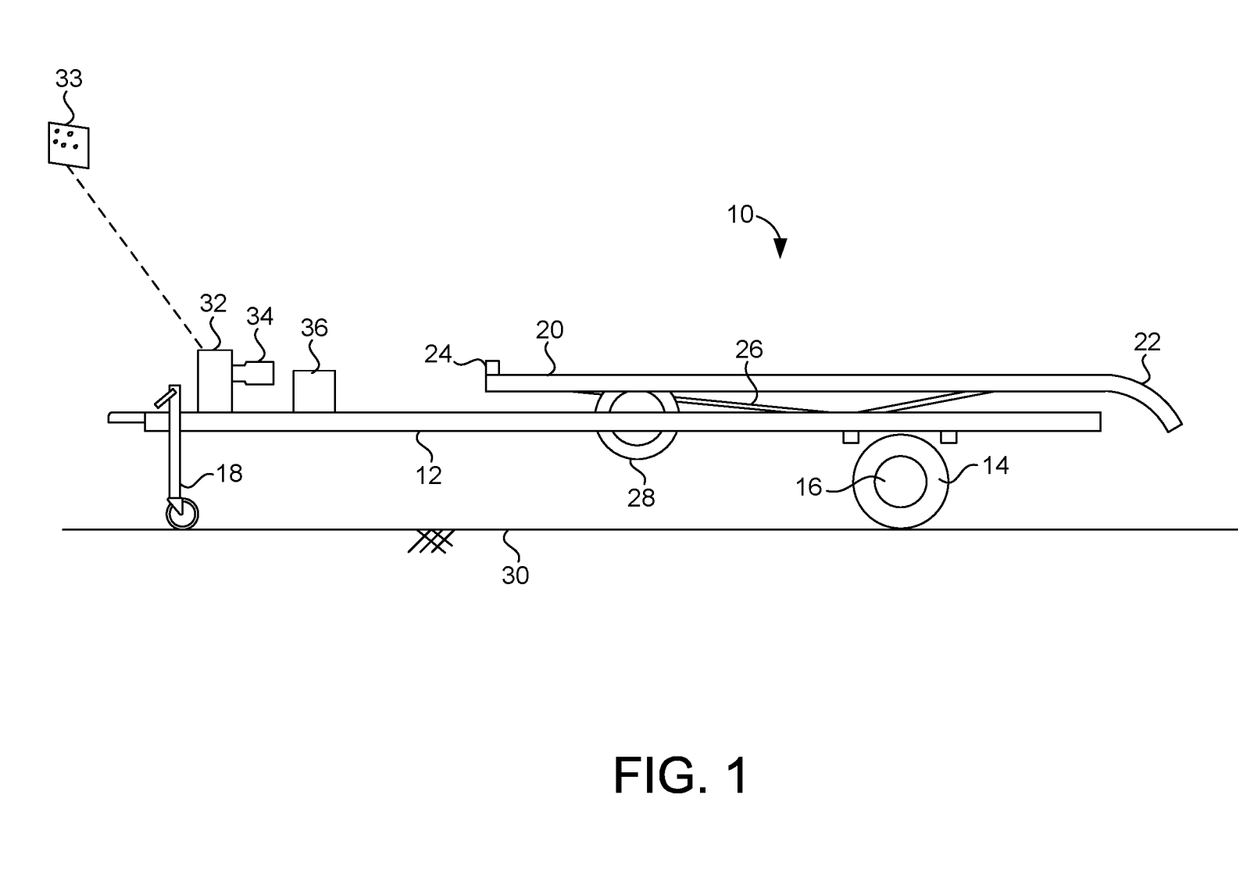
FIG. 1 is a side view of the boat lift trailer of the present invention.

Referring to FIG. 1, there is shown the boat lift trailer 10 of the present invention. The boat lift 10 of the present invention includes a trailer body 12. The trailer body 12 is preferably of a steel frame structure.

The trailer body 12 has a back stationary axle 16 with wheels and tires 14 affixed thereto. Opposite the back stationary axle 16 is a trailer jack 18. The trailer jack 18 serves to hold the trailer body 12 in an upright position when the boat lift trailer 10 is not attached to a tow vehicle. As used herein, "stationary axle" means that the axle is stationary or affixed to the trailer body. The wheels and components of the stationary axle can rotate as necessary so as to allow for movement of the trailer service on the trailer body on the ground surface there below.

The boat lift trailer 10 also has a lifting surface 20 positioned above the trailer body 12. The lifting surface 20 is also preferably of a frame structure and has curved ends 22 at an end thereof opposite the trailer jack 18. The curved ends 22 serve to allow the boat lift trailer 10 easier access to the interior of a boat lift to be removed from the water. The lifting surface 20 is positioned above the trailer body 12 by a lifting means 26. Preferably, the lifting means is a scissor lift 26. However, the lifting means can be any number of mechanisms including a jack such as a hydraulic jack, a motor power mechanism, a ratchet type system, or similar mechanisms.

In FIG. 1, the lifting surface 20 is shown as being positioned adjacent the trailer body 12 of the boat lift trailer 10. The lifting surface 20 has a pair of rubber lift stop bumpers 24 at a front edge thereof opposite the curved ends 22. The rubber lift stopped bumpers 24 serve to prevent a boat lift, when positioned on the trailer, from moving or shifting too far forward.

Also shown in FIG. 1 is the front lift pivoting axle assembly 28 having wheels thereon. In FIG. 1, the front lift pivoting axle assembly 28 is shown above the ground surface, such that when the trailer boat lift trailer 10 is towed, it only rides on the wheels and tires 14 of the back stationary axle 16.

Preferably, both the front lift pivoting axle 28 and scissor lift 26 are hydraulically powered. A control panel 32 is positioned at the front of the boat lift trailer 10 adjacent to trailer jack 18. Hydraulic pumps 34 are also positioned adjacent the control panel 32. The hydraulic pumps 34 serve to power the scissor lift 26 and the front lift pivoting axle 28. Batteries 36 are also positioned adjacent the hydraulic pumps 34 and control panel 32. Preferably, there are two batteries 36 for powering the two hydraulic pumps 34. While hydraulic mechanisms are preferred, any number of actuators could be utilized with the front lift pivoting axle 28 so as to accomplish the same end result. The actuator could also be in the form of a pneumatic cylinder.

Figure 2:
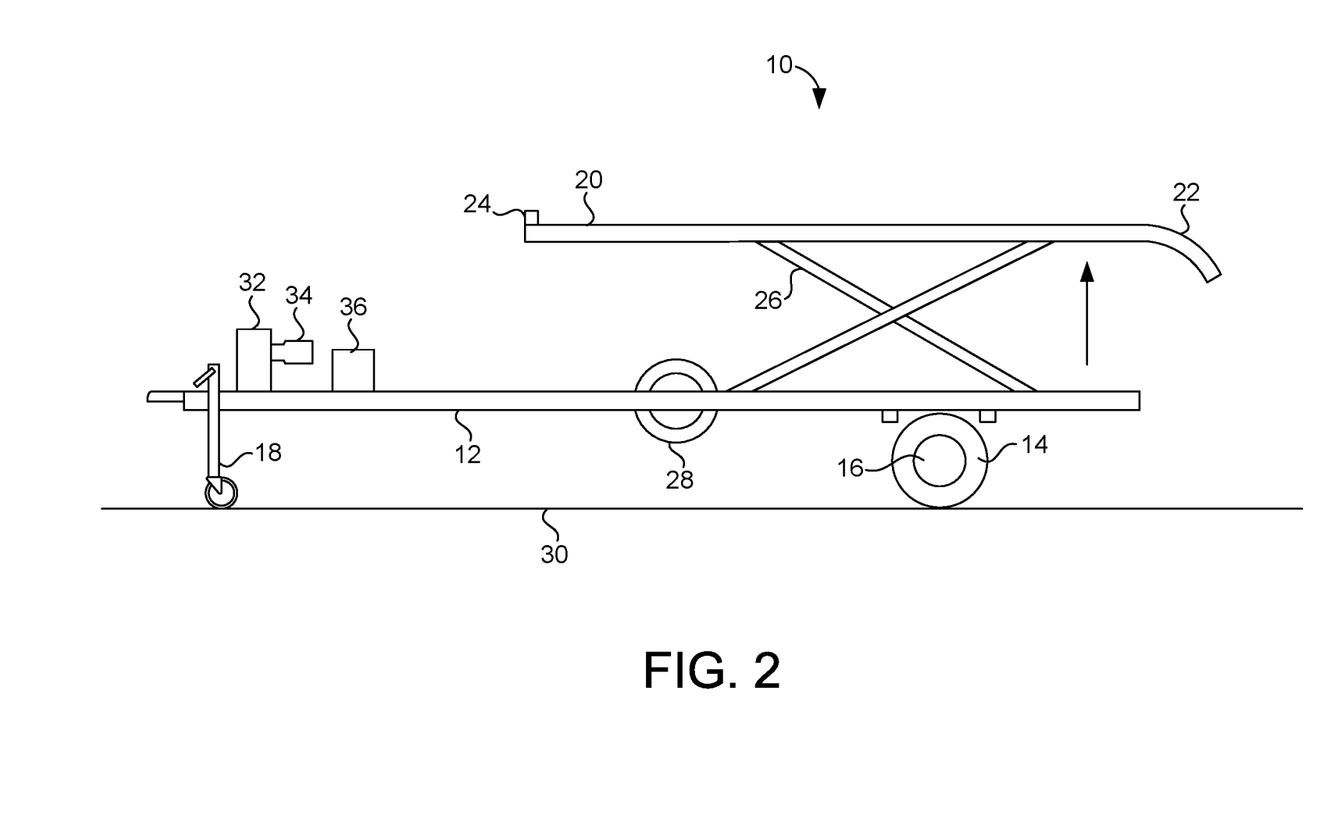
FIG. 2 is a side view of the boat lift trailer of the present invention, wherein the lifting surface is extended above the trailer body.

Referring to FIG. 2, there is shown the boat lift trailer 10 in a configuration wherein the scissor lift 26 is extended so as to position the lifting surface 20 away from the trailer body 12. In FIG. 2, it can be seen how the scissor lift 26 is of a generally X-shaped configuration. FIG. 2 also shows the front lift pivoting axle 28 positioned adjacent the trailer body 12 in a stowed position, showing the independent operation of the scissor lift 26 and the front lift pivoting axle 28.

Figure 3:
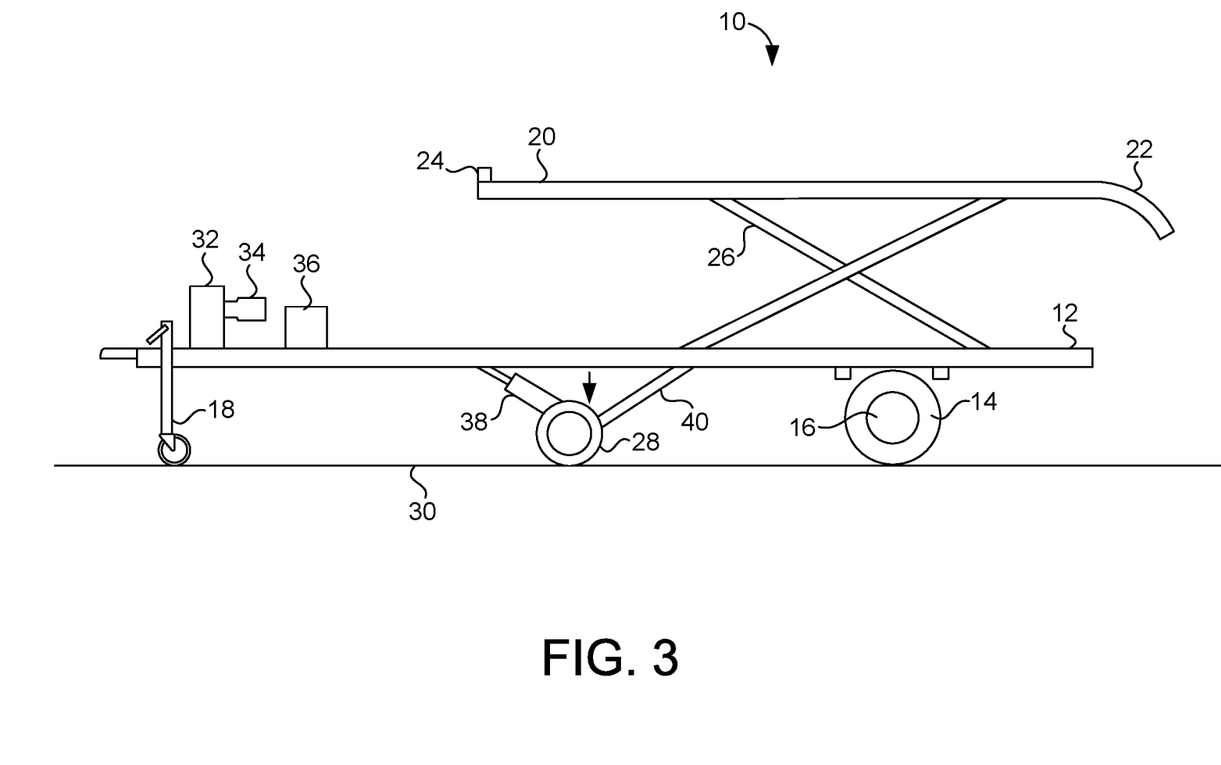
FIG. 3 is a side view of the boat lift trailer of the present invention, wherein the lifting surface is moved upwardly from the trailer body, and the front lift pivoting axle is lowered to the ground surface.

Referring to FIG. 3, there is shown the boat lift trailer 10 in a configuration wherein both the scissor lift 26 and the front lift pivoting axle 28 are in a deployed position. In FIG. 3, the wheels of the front lift pivoting axle are in contact with the ground surface 30 therebelow. FIG. 3 also shows the axle hydraulic cylinder 38 and pivoting axle member 40, which in conjunction with each other serve to position the front lift pivoting axle 28 onto the ground surface 30 therebelow. Further actuation of the axle hydraulic cylinder 38 will cause the trailer body 12 to be pushed upwardly, such that the wheels and tires 14 of the back stationary axle 16 will not be in contact with the ground surface 30. This configuration is shown in other figures herein.

Figure 4:
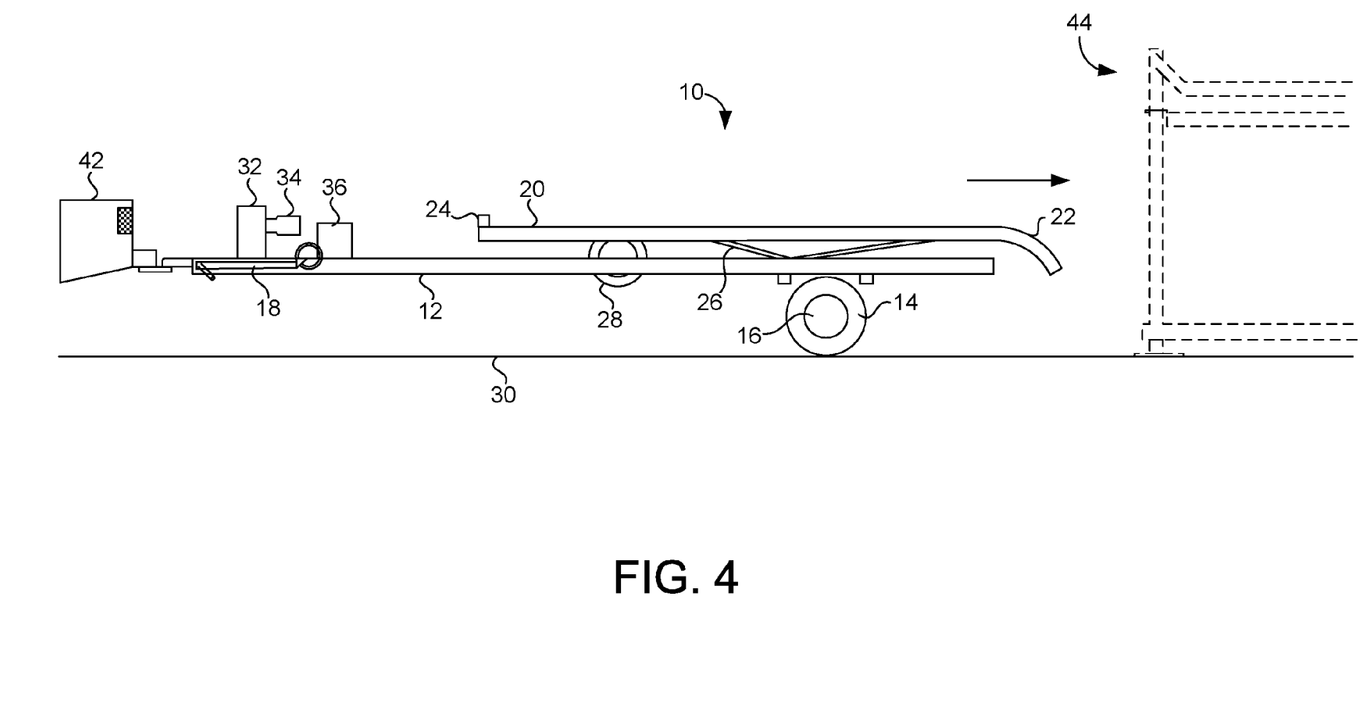
FIGS. 4-7 show the method of the present invention, wherein the boat lift trailer is used to remove a boat lift from the water.

FIGS. 4 through 7 show the process and method of the present invention wherein the boat lift trailer 10 is used to remove a boat lift 44 out of the water. In FIG. 4, it can be seen that the boat lift trailer 10 is affixed to a truck or other tow vehicle 42. The truck or tow vehicle 42 moves the boat lift trailer 10 in a direction towards the boat lift or hoist 44 (shown in broken lines). The boat lift trailer 10 of the present invention can be used with a variety of boat lifts 44, including the most common four-post setup.

Figure 5:
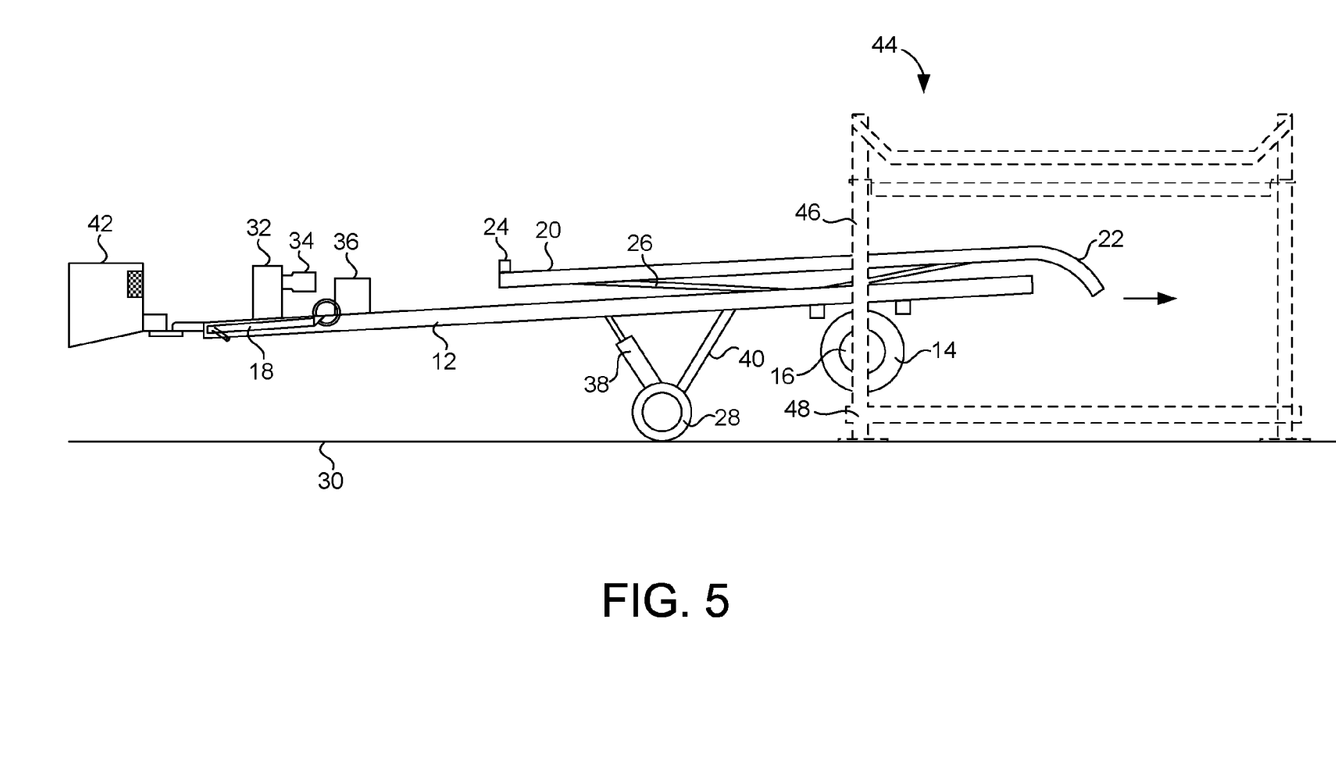

As the boat lift trailer 10 approaches the boat lift or hoist 44, the hydraulics controlling the front lift pivoting axle and wheels 28 are actuated. FIG. 5 shows how the front lift pivoting axle and wheels 28 have been deployed downwardly by the axle hydraulic cylinder 38, causing the body of the boat lift trailer 10 opposite the tow vehicle 42 to be angled upwardly. This causes the wheels and tires 14 of the back stationary axle 16 to be raised above the underlying surface 30. By raising the back stationary axle 16, the wheels and tires 14 thereof can pass into the interior of the structure of the boat lift or hoist 44 over the lower horizontal members 48 and between the front vertical post members 46. As can be seen in FIG. 5, the curved ends 22 of the lifting surface 20 enable the lifting surface 20 to more easily access the interior of the boat lift 44 structure.

The tow vehicle 42 continues to back up such that the wheels and tires 14 of the back stationary axle 16 are clear of the lower horizontal members 48 of the boat lift or hoist 44. As can be seen in FIG. 5, during this stage of the process, the trailer is rolling on the wheel or wheels of the front lift pivoting axle 28, while the lifting surface 20 is still in a stowed position.

Figure 6:
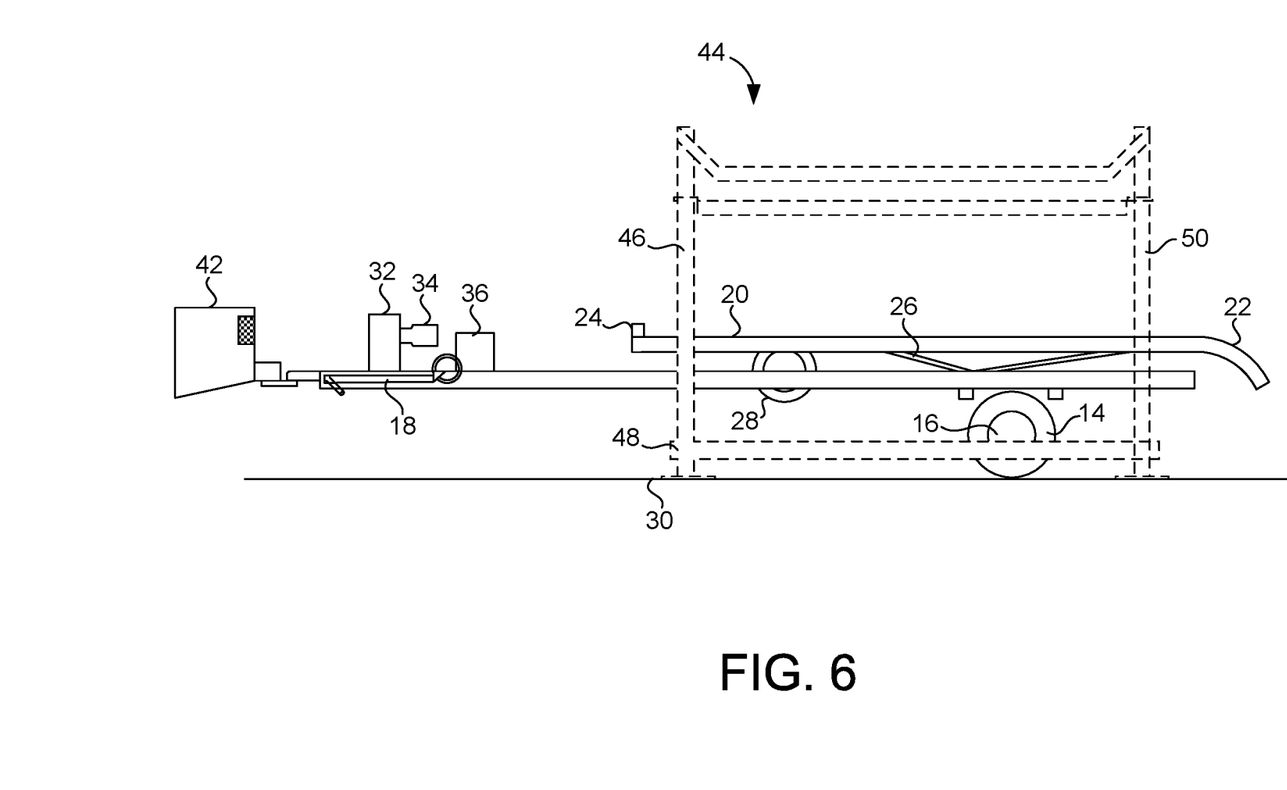

FIG. 6 shows the boat lift trailer 10 positioned fully within the interior of the boat lift 44. At this point in the process, the trailer can then commence lifting operations. As can be seen, the front lift pivoting axle 28, and the wheels thereof, are in a stowed position above the ground. The wheels of the front lift pivoting axle 28 were raised prior to coming into contact with the lower horizontal members 48 of the boat lift 44. It is also worth noting that the trailer jack 18 has been in a stowed position during the process of the present invention.

Figure 7:
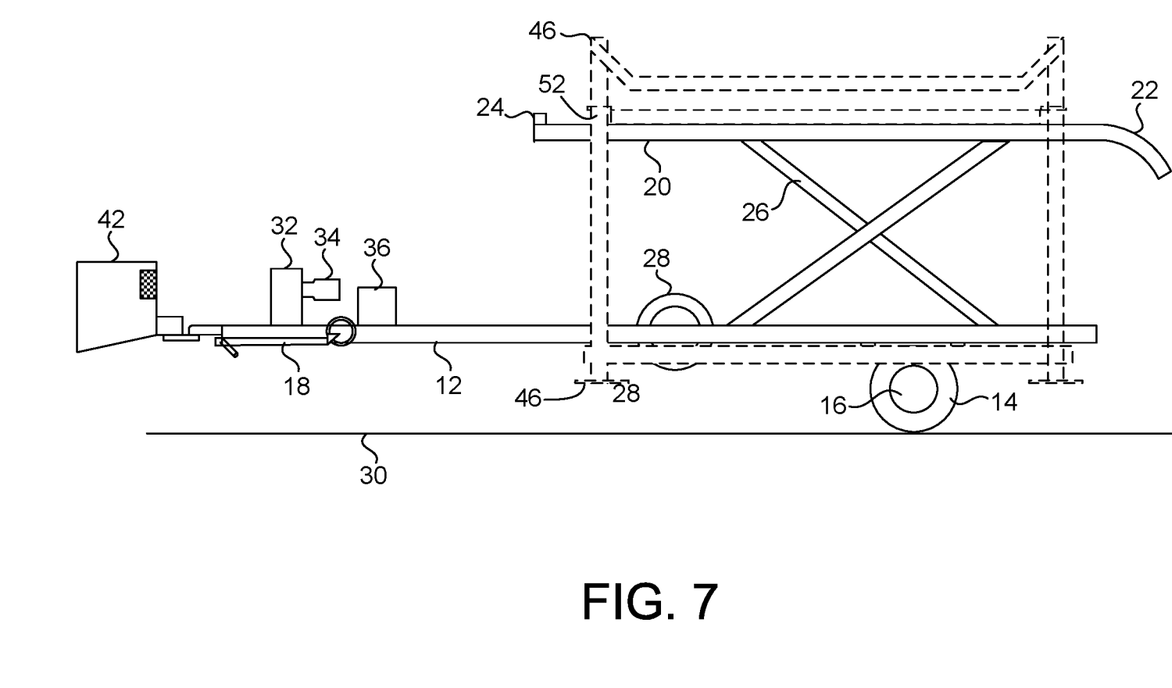

FIG. 7 shows the boat lift trailer 10 of the present invention having lifted the boat lift 44 above the ground surface 30. To lift the boat lift 44, the scissor lift 26 is deployed so as to cause the lifting surface 20 to extend upwardly therefrom. Once the lifting surface 20 contacts the lower end of the upper portions of the frame of the boat lift 44 (namely, the upper horizontal members 52 and any other cross members), the lifting surface 20 can then apply an upward force on the boat lift 44. As can be seen in FIG. 7, the bottom ends of the vertical post members 46 are now positioned above the underlying surface 30. The underlying surface 30, as used herein, includes a ground surface below a level of water. At this point, the boat lift 44 can be safely removed from the water. The boat lift, being further secured on the boat lift trailer 10, is prevented from sliding forward due to the rubber lift stop bumpers 24. Due to the remote control capabilities of the control panel 32, the entire operation can take place without the operator of the tow vehicle 42 having exited the vehicle and entered the water adjacent the boat lift 44.

As such, use of the boat lift trailer 10 of the present invention provides a quick and safe method and apparatus for removing a boat lift from the water. Further, the nature of the boat lift trailer allows for stable and secure towing of the boat lift, while minimizing danger to both the operators and to the general public traveling on the roads whereon the tow vehicle 42 travels. The boat lift trailer 10 of the present invention is very versatile and can be used with most of the common boat lifts available.

Figure 8:
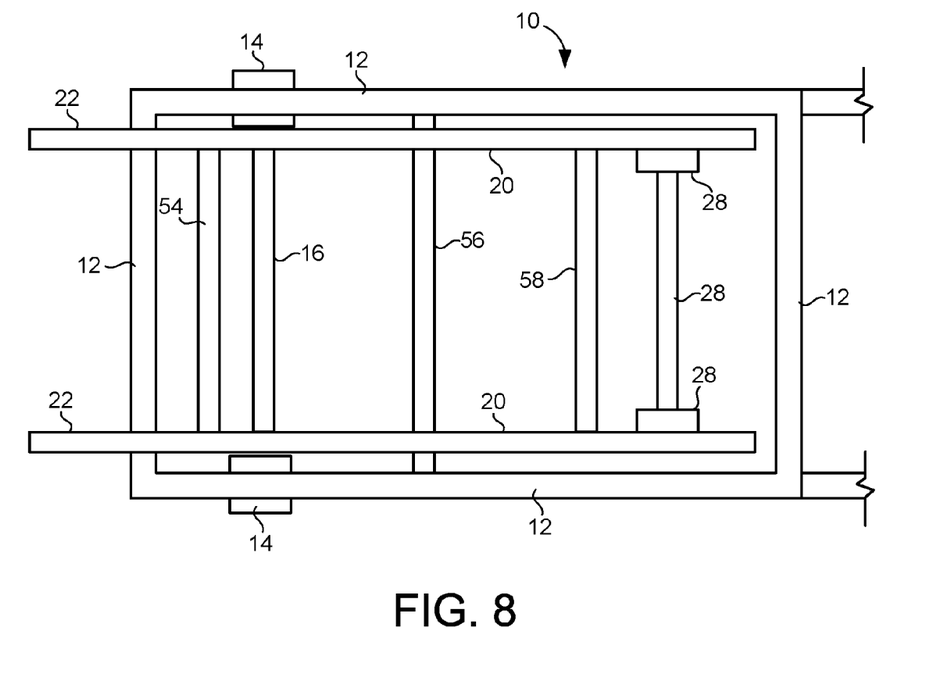
FIG. 8 is a top view of the boat lift trailer of the present invention.

Finally, FIG. 8 shows a top view of the frame structure of the boat lift trailer 10. As can be seen in FIG. 8, the trailer body 12 is of a generally rectangular frame structure. Further, the lifting surface 20 also comprises a frame structure having a number of cross members 54, 56 and 58. The scissor lift 26 engages a number of these cross members, preferably cross members 54 and 58. FIG. 8 also shows how the axle 28 extends between the wheels of the front lift pivoting axle, and how the back stationary axle 16 extends between the wheels 14 thereof. The frame structure shown in FIG. 8 is but one of a number of possible configurations that fall within the concept of the present invention.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. An apparatus for removing a boat lift from a body of water, the apparatus comprising:
    a trailer body having a stationary axle adjacent a first end thereof and a trailer jack adjacent a second end thereof, said stationary axle having wheels connected thereto;
    a lifting surface movably positioned relative to said trailer body, said lifting surface comprising a frame structure having a pair of lifting arms, each of said lifting arms having a first end which curves downwardly in a direction towards the surface therebelow;
    a lifting means affixed to said trailer body and to said lifting surface, said lifting means for lifting said lifting surface from a first position adjacent said trailer body to a second position away from said trailer body; and
    a pivoting axle assembly affixed to said trailer body between said first end and said second end, said pivoting axle assembly having at least one wheel thereon, said pivoting axle assembly movable from a first position wherein the wheel of said pivoting axle assembly is positioned above a surface therebelow to a second position wherein the wheel of said pivoting axle assembly is positioned on the surface therebelow, said wheels of said stationary axle of said trailer body being above the surface therebelow when said pivoting axle assembly is in said second position.

2. The apparatus of claim 1, said lifting means comprising a scissor lift.

3. The apparatus of claim 1, each of said lifting arms having a bumper at a second end thereof opposite said first end.

4. The apparatus of claim 1, further comprising;
    a control panel mounted adjacent said second end of said trailer body, said control panel suitable for selectively operating said lifting means and said pivoting axle assembly.

5. The apparatus of claim 4, further comprising:
    a remote control in communication with said control panel.

6. The apparatus of claim 1, further comprising:
    at least one hydraulic pump for operating at least one of said lifting means and said pivoting axle assembly.

7. An apparatus for removing a boat lift from a body of water, the apparatus comprising:
    a trailer body having a stationary axle adjacent a first end thereof and a trailer jack adjacent a second end thereof, said stationary axle having wheels connected thereto;
    a lifting surface movably positioned relative to said trailer body;
    a lifting means affixed to said trailer body and to said lifting surface, said lifting means for lifting said lifting surface from a first position adjacent said trailer body to a second position away from said trailer body; and
    a pivoting axle assembly affixed to said trailer body between said first end and said second end, said pivoting axle assembly comprising:
        an axle having wheels at opposing ends thereof;
        a pivoting member affixed to said axle at one end thereof and to said trailer body at an opposite end thereof; and
        an actuator affixed to said axle at one end thereof and to said trailer body at an opposite end thereof, said pivoting axle assembly movable from a first position wherein said wheels of said pivoting axle assembly are positioned above a surface therebelow to a second position wherein said wheels of said pivoting axle assembly are positioned on the surface therebelow, said wheels of said stationary axle of said trailer body being above the surface therebelow when said pivoting axle assembly is in said second position.

8. The apparatus of claim 7, further comprising:
a hydraulic pump operatively connected to said actuator, said actuator comprising a hydraulic cylinder.

9. A trailer apparatus for removing a boat lift from a body of water, the trailer apparatus comprising:
a body having wheels adjacent a first end thereof and a trailer jack adjacent a second end thereof;
a lifting frame positioned above said trailer body, said lifting frame having a first lifting arm and a second lifting arm;
a scissor lift affixed to said body and to said lifting frame, said scissor lift movable from a first position wherein said lifting frame is positioned adjacent said body to a second position wherein said lifting frame is positioned upwardly away from said body; and
a pivoting axle assembly affixed to said body between said wheels and said trailer jack, said pivoting axle assembly having at least one wheel thereon, said pivoting axle assembly movable from a first position wherein said wheel of said pivoting axle assembly is positioned above an underlying surface below to a second position wherein said wheel of said pivoting axle assembly is positioned on the underlying surface, said wheels of said stationary axle of said body being above the underlying surface when said pivoting axle assembly is in said second position.

10. The trailer apparatus of claim 9, each of said first lifting arms having a bumper on an end thereof, each of said lifting arms having a curved end at an opposite end thereof.

11. The trailer apparatus of claim 9, said pivoting axle assembly comprising:
an axle having wheels at opposing ends thereof;
a pivoting member affixed to said axle at one end thereof and to said body at an opposite end thereof; and
a hydraulic cylinder affixed to said axle at one end thereof and to said body at an opposite end thereof.

12. The trailer apparatus of claim 11, further comprising:
a first hydraulic pump operatively connected to said lifting frame; and
a second hydraulic pump operatively connected to said pivoting axle assembly.

13. The trailer apparatus of claim 12, further comprising:
a control panel mounted on said body adjacent said trailer jack, said control panel suitable for selectively operating said first hydraulic pump and said second hydraulic pump.

14. The trailer apparatus of claim 13, further comprising:
a remote control in communication with said control panel.

15. The trailer apparatus of claim 9, the top surfaces of said first lifting arm and said second lifting arm defining a lifting surface.

16. A method of removing a boat lift from a body of water, the boat lift having upper and lower horizontal members and vertical post members, the method comprising the steps of:
providing a trailer having a body with wheels thereon, the trailer having a lifting surface vertically movable from a first position adjacent the body to a second position away from the body, the trailer having a pivoting axle assembly with wheels thereon, the pivoting axle assembly movable from a first position adjacent the body to a second position wherein the wheels of the pivoting axle assembly contact an underlying surface;
moving the trailer to a position adjacent the boat lift;
lowering the pivoting axle assembly from the first position to the second position so as to cause the wheels of the pivoting axle assembly to contact the underlying surface and also to cause the wheels of the trailer body to be positioned off the underlying surface a suitable distance so as to clear the lower horizontal members of the boat lift;
moving the trailer such that the lifting surface is within the vertical post members of the boat lift;
raising the pivoting axle assembly from the second position to the first position; and
raising the lifting surface so as to contact the bottom sides of the horizontal members and to lift the boat lift upwardly.

17. The method of claim 16, further comprising the step of:
moving the trailer forward so as to remove the boat lift from the body of water.

18. The method of claim 16, further comprising the step of:
remotely controlling the operation of the pivoting axle assembly and the movement of the lifting surface.

* * * * *